Jan. 19, 1965 W. R. MATTHEWS 3,166,109
WOOD CHIPPER
Filed Dec. 1, 1960 8 Sheets-Sheet 4
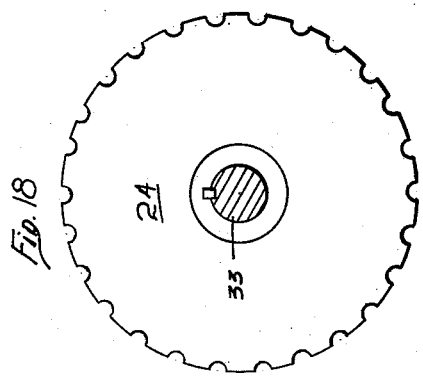
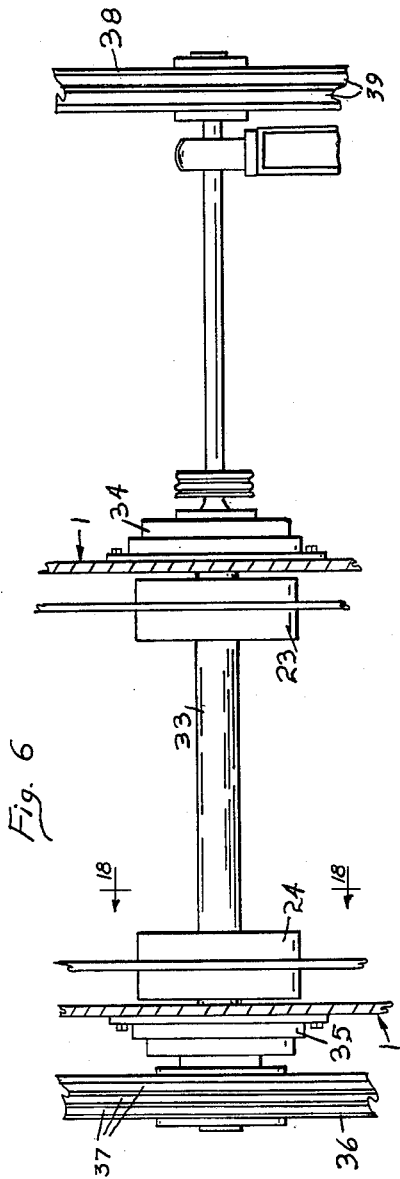
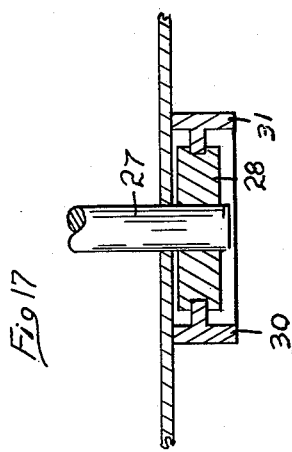
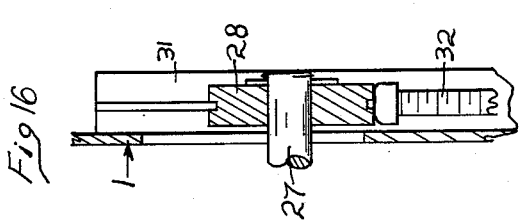
INVENTOR.
WILLIAM R. MATTHEWS
BY
ATTY.

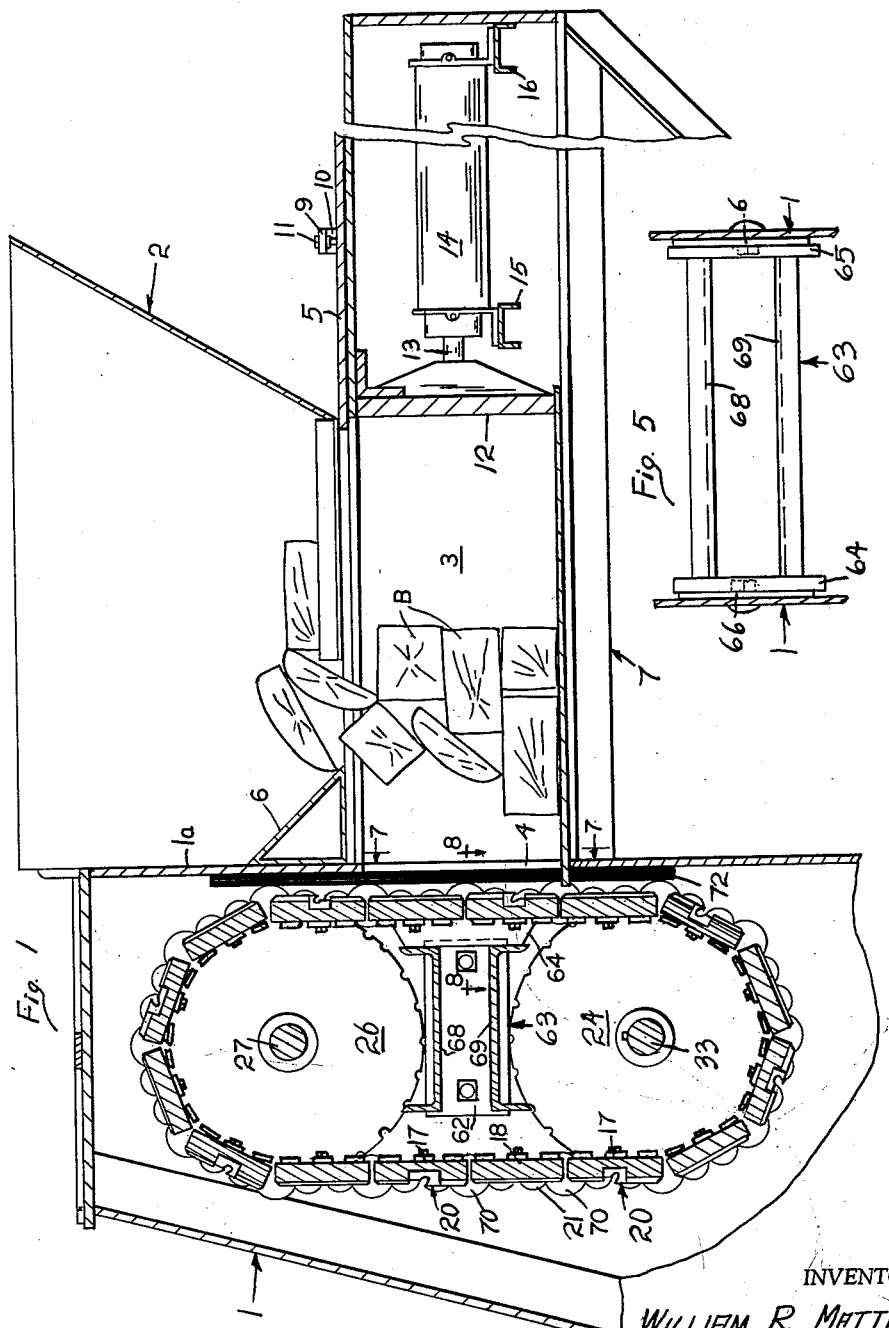

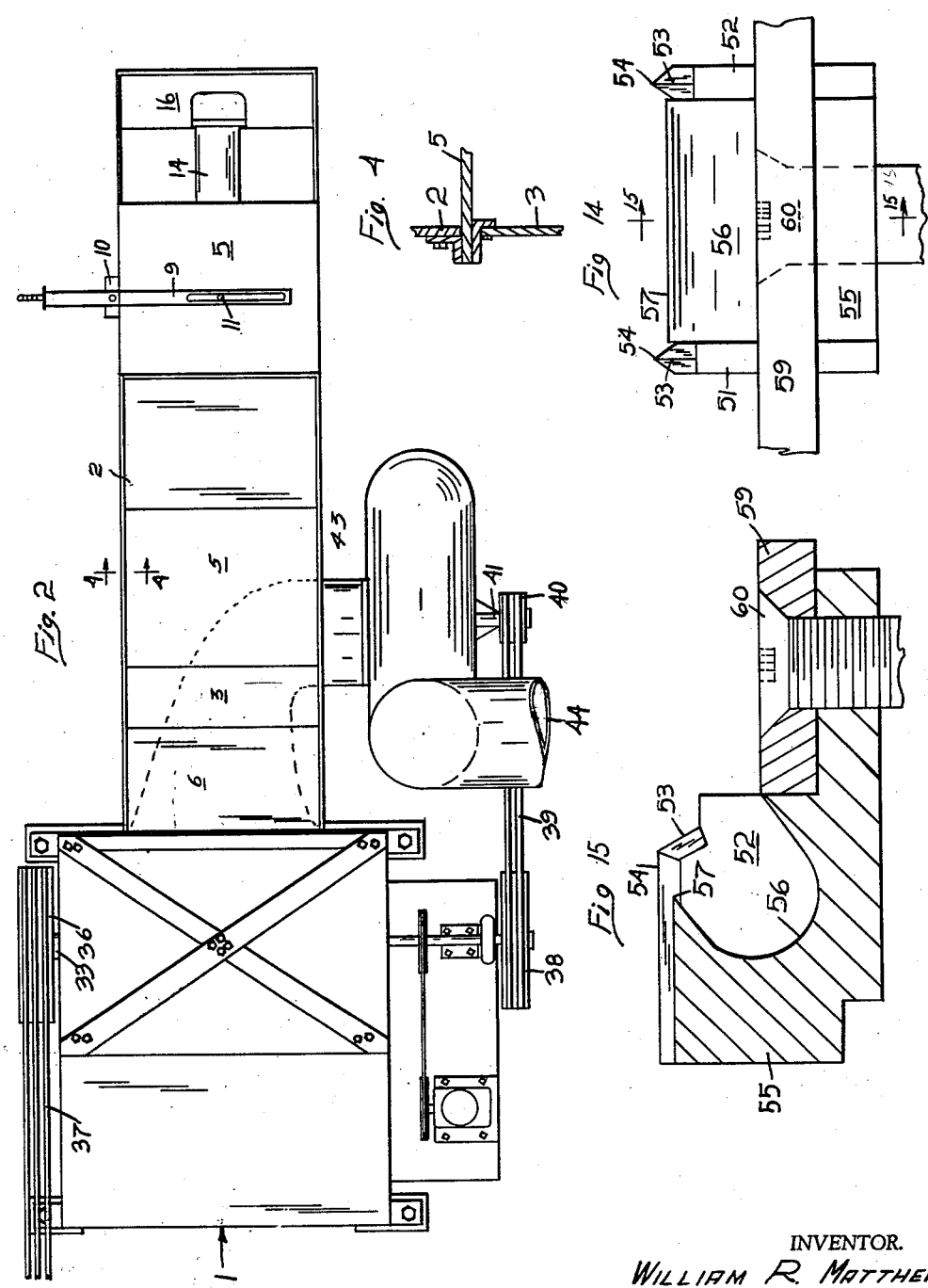

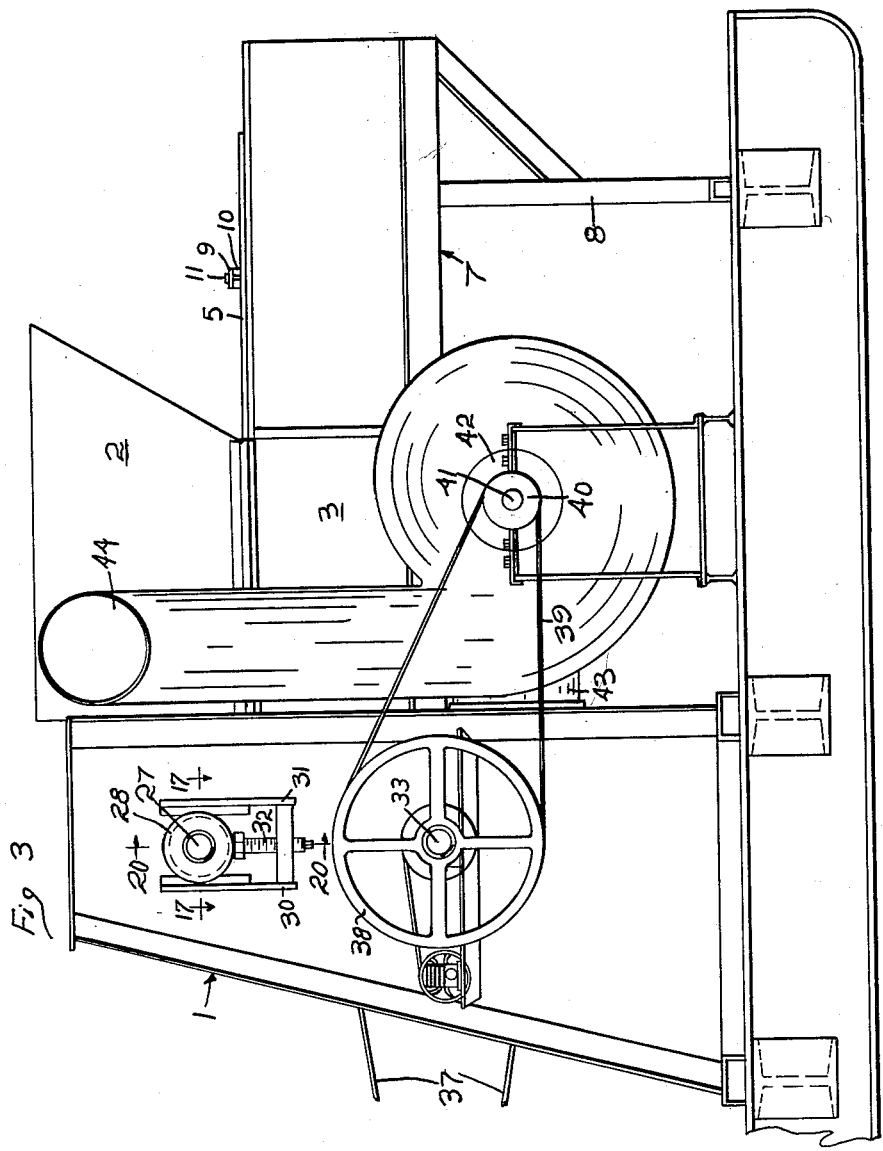

Jan. 19, 1965  W. R. MATTHEWS  3,166,109
WOOD CHIPPER

Filed Dec. 1, 1960  8 Sheets-Sheet 5

INVENTOR.
WILLIAM R. MATTHEWS.
BY
*Sreckwell*
ATTY.

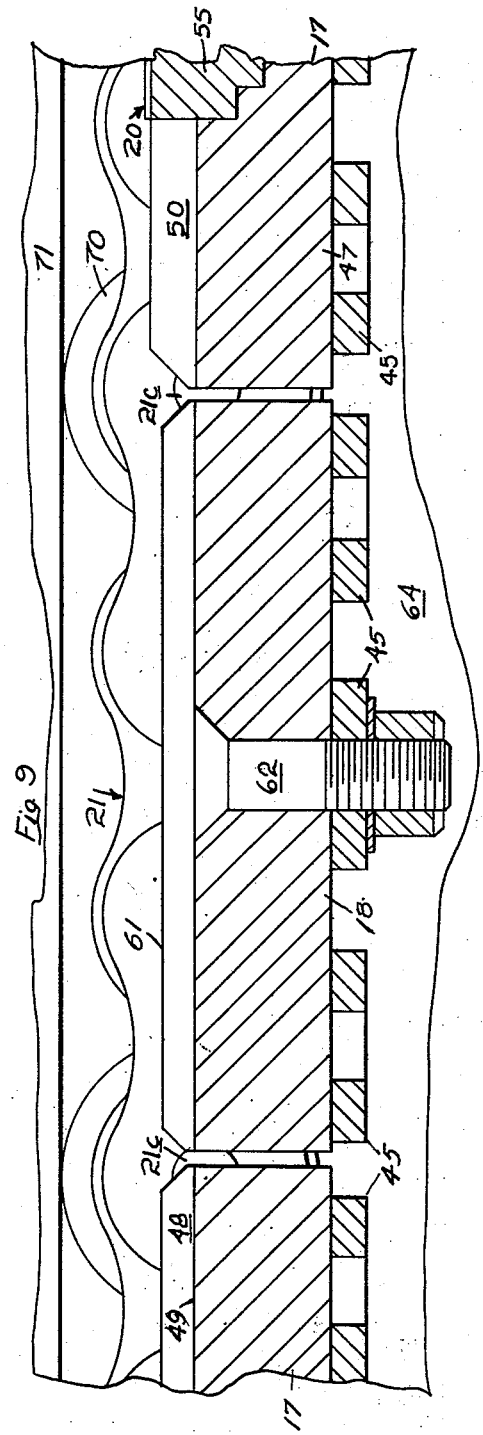
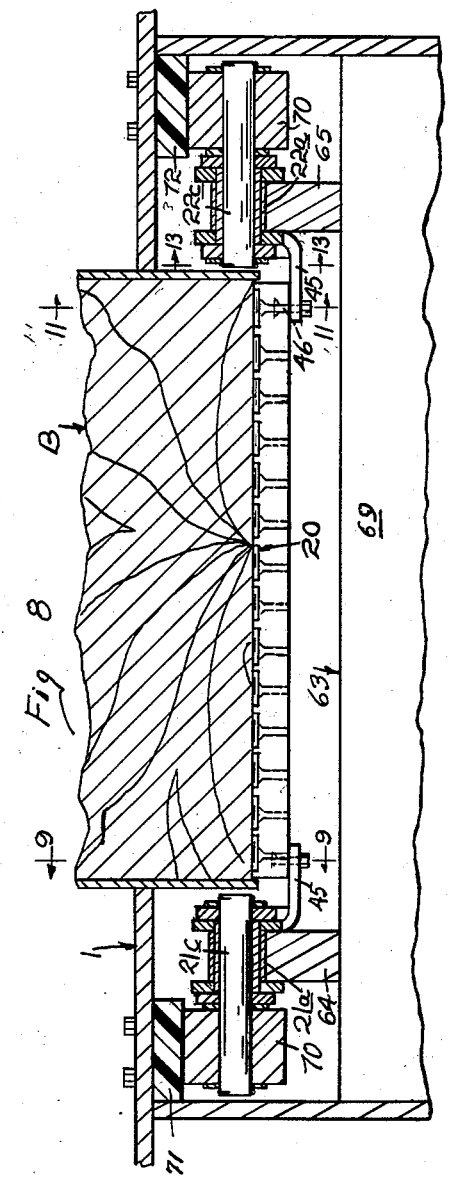

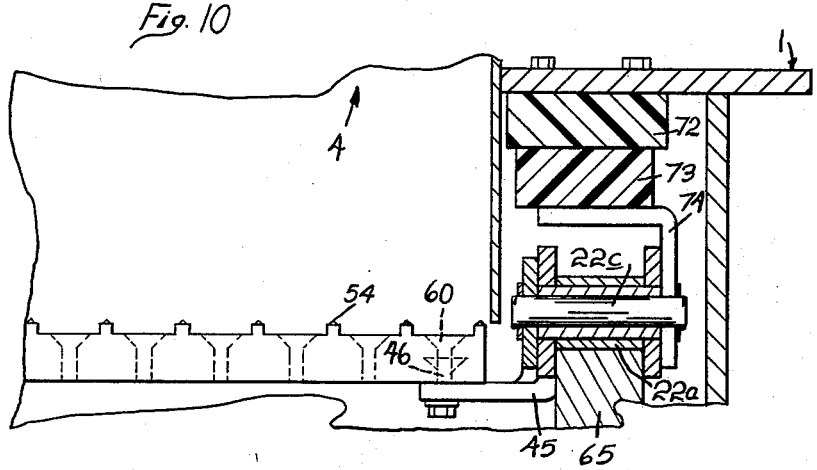
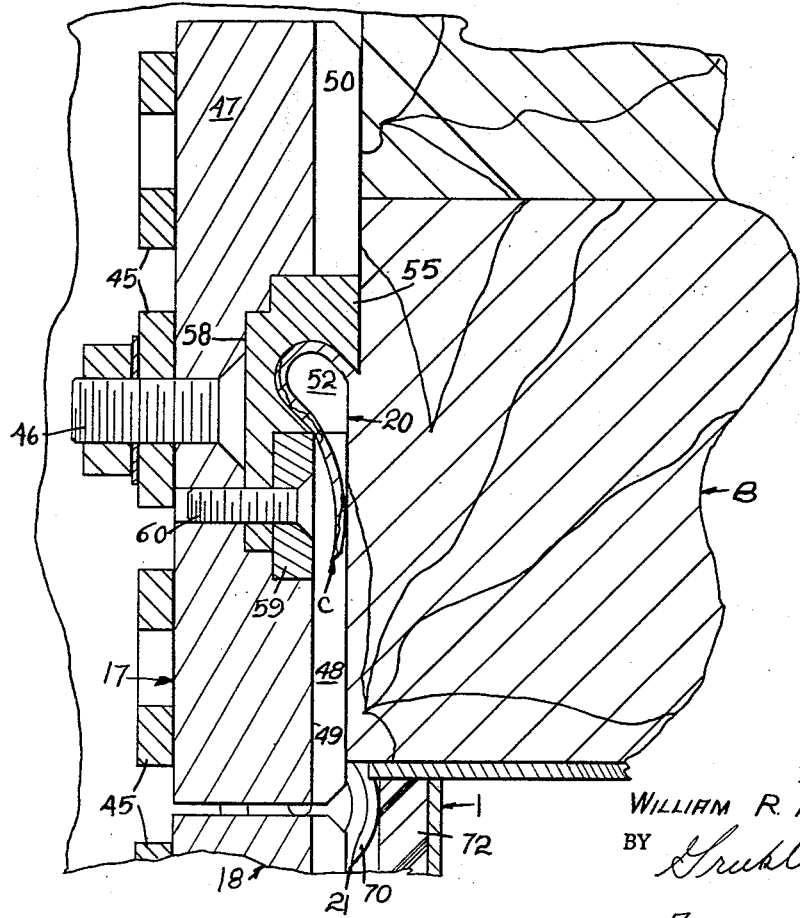

Jan. 19, 1965   W. R. MATTHEWS   3,166,109
WOOD CHIPPER

Filed Dec. 1, 1960   8 Sheets-Sheet 8

INVENTOR.
WILLIAM R. MATTHEWS
BY
*Fred Wells*
ATTY.

United States Patent Office 3,166,109
Patented Jan. 19, 1965

3,166,109
WOOD CHIPPER
William R. Matthews, W. 1022 7th, Spokane, Wash.
Filed Dec. 1, 1960, Ser. No. 72,939
10 Claims. (Cl. 144—162)

My invention relates to a wood chipper adapted to convert wood blocks and the like into uniform chips or wafers. It is the principal purpose of this invention to provide a machine which will cut up blocks or pieces of wood and produce chips or wafers of a desired uniform thickness wherein the fiber length also is substantially uniform. This invention is an improvement upon the machine shown in my prior patent No. 2,876,811, granted March 10, 1959, for Wood Wafer Cutting Machine.

For several reasons it is desirable to maintain rather accurate control of thickness and fiber length in producing wafers or chips from wood. For example, in certain pulping processes such as the Continuous Cold Soda Pulping Process, uniformity of chip thickness makes it possible to obtain more uniformity in the digesting. For making wafer board where the wafers are bonded together in random overlapped arrangements it is desirable to have wafers of uniform thickness. My improved machine is designed to enable the operator to select the wafer thickness and to cut the wood into wafers with the fibers of uniform length.

More particularly it is the purpose of my invention to provide a wood chipper wherein an endless carrier has a multiplicity of cutting and chip carrying heads thereon arranged to sweep across a wood block and slice from it wafers of like thickness wherein the fibers are essentially lengthwise of the wafers produced, the carrier embodying endless chains connected by alternate cutter carrying bars and block support and gage bars which are moved in a plane across the face of the wood.

Other and more detailed objects of my invention will appear from the following description and the accompanying drawings illustrating the preferred form of the invention. The drawings and description are illustrative only, however, and are not intended to limit the invention except insofar as it is limited by the claims.

In the drawings:

FIGURE 1 is a vertical sectional view through a wood chipper embodying my invention;

FIGURE 2 is a plan view of the machine;

FIGURE 3 is a side view of the machine;

FIGURE 4 is an enlarged fragmentary sectional view taken on the line 4—4 of FIGURE 2;

FIGURE 5 is a detailed view illustrating the chain backing frame and its mounting on the housing of the machine;

FIGURE 6 is a detailed view of the drive shaft and sprocket assembly;

FIGURE 8 is an enlarged fragmentary sectional view taken on the line 8—8 of FIGURE 1, showing the wood block resting against the cutter mechanism;

FIGURE 9 is an enlarged fragmentary section view taken on the line 9—9 of FIGURE 8, but with the wood block removed and the feed chute wall broken away;

FIGURE 10 is a fragmentary sectional view taken substantially on the same line as FIGURE 8 but showing a modified construction;

FIGURE 11 is an enlarged fragmentary sectional view taken on the line 11—11 of FIGURE 8, showing how the cutters engage the wood blocks;

FIGURE 14 is an enlarged front face view of one of the cutters and its mounting bar;

FIGURE 15 is a sectional view taken on the line 15—15 of FIGURE 4;

FIGURE 16 is an enlarged fragmentary sectional view taken on the line 16—16 of FIGURE 3;

FIGURE 17 is an enlarged fragmentary sectional view taken on the line 17—17 of FIGURE 3; and FIGURE 18 is a fragmentary sectional view taken on the line 18—18 of FIGURE 6.

Figure 7:
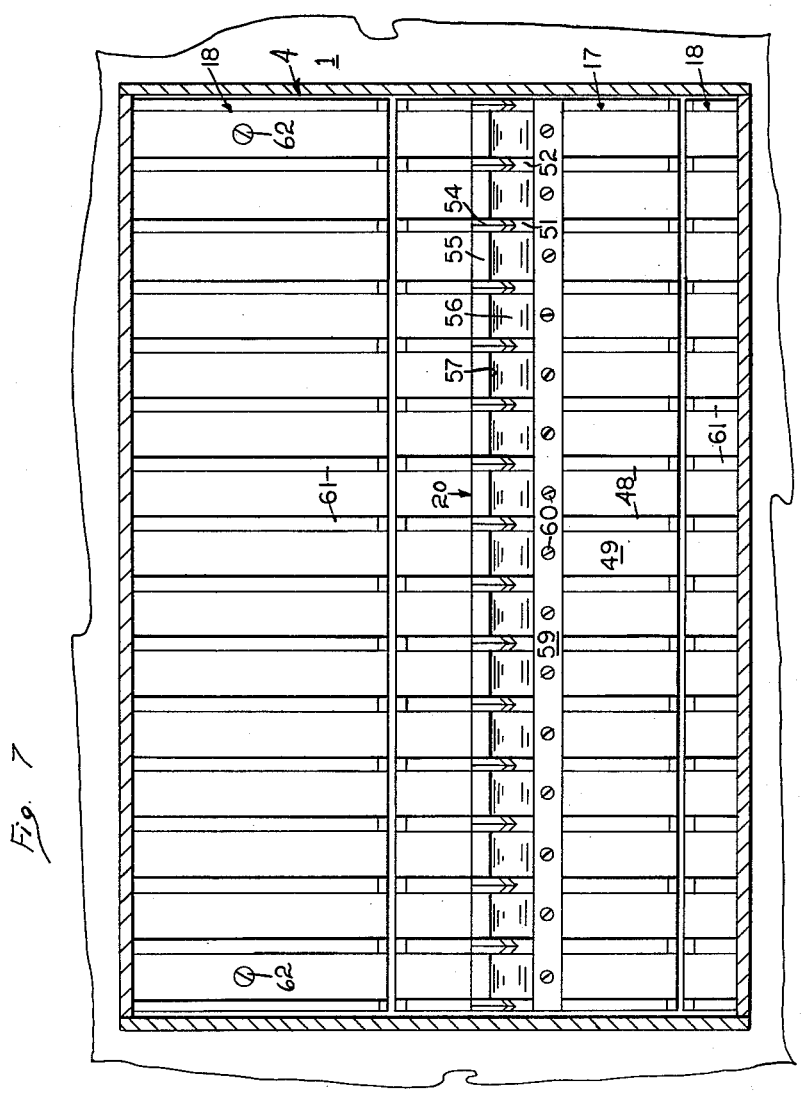
FIGURE 7 is an enlarged fragmentary sectional view looking at the face of the cutter assembly from line 7—7 of FIGURE 1.
Figure 12:
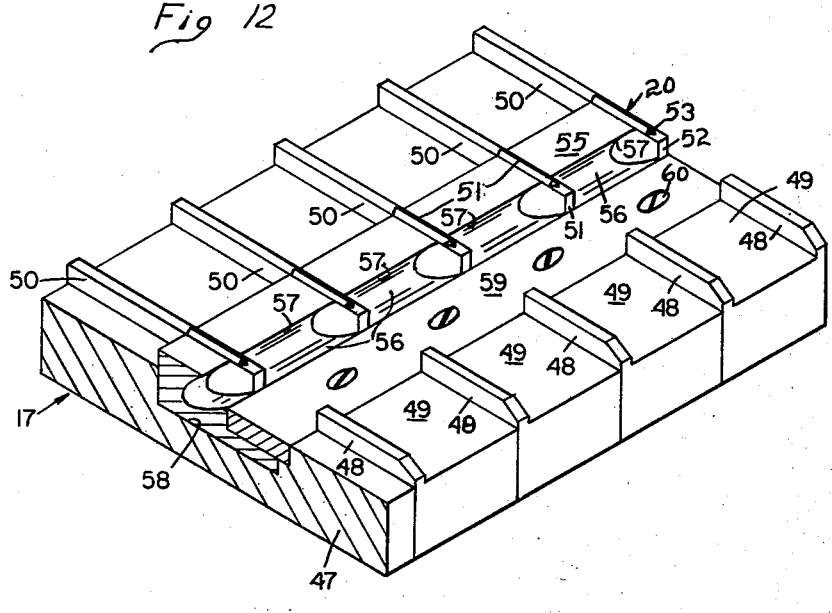
FIGURE 12 is a fragmentary perspective view of an assembly of the cutters.

Referring now to the drawings, my invention is embodied in a machine wherein the numeral 1 indicates a housing for the cutting mechanism. A hopper for supplying wood pieces is shown at 2 and beneath the hopper 2 is a feed chute 3. An aperture 4 is provided in the adjacent face 1a of the housing in alignment with the feed chute 3. The hopper opens at the bottom into the feed chute 3 and a slidable cover plate 5 is movable between the hopper and the feed chute to vary the size of the opening. The face 1a of the housing 1 carries an inclined projection 6 that partially blocks passage between the hopper 2 and the feed chute 3. A framework 7 having legs 8 near one end and connecting at its other end to the housing 1 supports the feed chute 3. A hand lever 9 is pivotally mounted on a lever support 10 at one side of the framework 7 and has a pin and slot connection 11 to the cover plate 5 for sliding the cover.

A pusher 12 is fitted in the feed chute 3 to push wood blocks or billets B toward the aperture 4 for slicing. The pusher is fixed to a piston rod 13 of a hydraulic jack 14. The jack 14 is mounted on two cross beams 15 and 16 that form part of the framework 7.

The cutting mechanism comprises an endless series of units or cross bars 17 and 18 that move downward across the opening 4 in the housing. The units 17 each carry cutting heads 20. The units 18 alternate with the units 17 and are spacers to separate the cutting heads far enough to enable the larger wood billets B to advance between passes of cutting heads across them. The units 17 and 18 are carried by two endless chains 21 and 22 which are trained about lower drive wheels 23 and 24 and upper guide sprocket wheels 25 and 26. The sprocket wheels 25 and 26 are mounted on a shaft 27 which is mounted in bearings 28 and 29. The bearings 28 and 29 are adjustably mounted in guide frames 30 and 31 mounted on the housing 1 and can be moved up by adjusting screws 32 to tighten the chains 21 and 22. See FIGURES 16 and 17.

The lower sprocket wheels 23 and 24 are affixed to a drive shaft 33 which is journalled in bearing blocks 34 and 35 mounted on the housing 1. The shaft 33 has a pulley 36 at one end adapted to receive belts 37 driven from any suitable power source. The other end of the shaft 33 has a pulley 38 thereon which is connected by belts 39 to a pulley 40 on the impeller shaft 41 of a blower 42. The blower 42 has an inlet conduit 43 opening into the housing 1 below the aperture 4. The outlet conduit 44 of the blower may lead to any desired disposal point.

Figure 13:
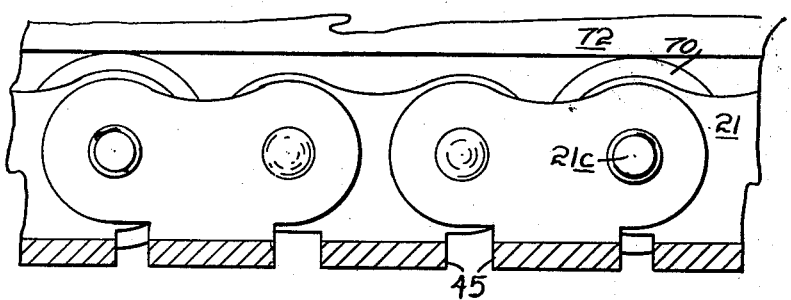
FIGURE 13 is an enlarged fragmentary sectional view taken on the line 13—13 of FIGURE 8.

The construction of the cutting mechanism is shown in FIGURES 7-9, and 13-15. In order to cut wafers of controlled thickness from the wood billets B (FIGURE 11) I provide support bars 45 extending from the links of the endless chains 21 and 22 and I mount the units 17 and 18 on these bars 45 using screw bolts 46 adjacent to the ends of the units and beneath the cutter heads 20. The units 17 are made up of blocks 47 and there is only one screw bolt connection 46 from each block 47 to a bar 45 on each chain so the blocks can separate from all but one pair of the bars while the chains 21 and 22 are going around the sprocket wheels 23, 24, 25 and 26. As arranged the blocks 47 have ribs 48 and 50 thereon. The flat surfaces 49 between the ribs 48 serve as supports for chips cut from the wood billets B. It will be noted that behind the cutter heads 20 the ribs 50 are higher than the ribs 48 in front of cutter heads by substantially the depth of cut made by the cutter heads.

Each cutter head 20 comprises two scoring blades 51 and 52 that are longitudinally aligned with the ribs 48 and 50. Each blade has a front cutting edge 53 and a top scoring edge 54. Between the blades 51 and 52 are slicing members 55 having cutting edges 57 and hollowed out portions at 56 to provide a gullet in which the chips C are re-directed forwardly after being sliced from a billet B. As illustrated in FIGURE 11 the front ribs 48 engage the wood in advance of the cutter heads 20 and limit its approach to the cutting edges 57 of the members 55. The rear ribs 50 support the wood behind the cutting edge to avoid tipping of the wood.

The block 47 is recessed at 58 to receive the blades 51 and 52 and the members 55. These blades and members seat in the recess 58 and are held down by a bar 59 and screws 60. This makes a simple arrangement for removal and replacement of the blades 51 and 52 and the members 55. Shims can be used in the recesses to compensate for reduction of the blades 51 and 52 and the members 55 due to sharpening and to wear.

The spacer units 18 are similar to the units 17 except that they do not carry cutter heads and their ribs 61 are continuous from end to end. Screw bolts 62 adjacent to the ends of the units 18 secure these units to the respective chains 21 and 22 through the bars 45.

It is essential that the units 17 and 18 be accurately guided across the aperture 4 while they are in engagement with the wood billets. To assure this the chains 21 and 22 are supported by a unique arrangement of bearings so that the pressure of the wood does not push them out of line. The chains have rollers 21a and 22a riding on two guide bars 64 and 65 which are part of a chain backing frame 63. The frame 63 has two end plates 66 and 67 bolted to the housing and cross channels 68 and 69 welded to the end plates. The guide bars 64 and 65 are welded to the cross channels 68 and 69 and have hardened faces on which the rollers 21a and 22a ride.

To offset the wood thrust I provide every third chain pivot of each chain with an elongated pivot pin 21c or 22c which mounts a roller 70. The rollers 70 bear upon bearing plates 71 and 72 that are fastened to the housing 1 to extend vertically thereon outside of the aperture 4. These bearing plates are preferably made of a low friction material that can withstand long continued use with little wear. The rollers 70 cooperate with the rollers 21a and 22a to keep the chains 21 and 22 and their bars 45 travelling in a straight line across the face of the aperture 4. Note that the rollers 70 are so positioned (FIGURE 1) as to support a bar 45 under each corner of each of the units 17 and 18.

In the modification illustrated in FIGURE 10 the rollers 70 are not used. Instead the links of the chains 21 and 22 are provided with extensions 74 which carry bearing bars 73. These bars 73 are made of a low friction material preferably that sold under the trade name Teflon. The bars 73 slide on the bearing plates 71 and 72 as the units 17 and 18 corresponding thereto pass across the aperture 4.

In operating the machine the hopper 2 is supplied with wood billets B of various sizes arranged with the grain of the wood running generally parallel to the plane of the aperture 4. The feed chute 3 is filled with these billets and the cover plate 5 is moved toward the housing 1 by means of the lever 9 to substantially confine the wood within the chute 3. The pusher plate 12 is retracted of course while the feed chute 3 is being filled. It is then pushed forward and the cutting mechanism is put into operation to move the cutter heads 20 down across the aperture 4 and to slice the wood into wafers that are uniform in thickness and in length along the grain. The wafers as they are sliced off by the edges 57 are curled over the gullets 56 and forwardly until they are discharged and removed below the aperture 4. The blower 42 draws the finished chips out of the housing for removal through the conduit 44. It should be noted that the scoring edges 54 of the blades 51 and 52 always leave the faces of the billets scored for the next cut by the slicing members 55.

The knives and slicing members can be easily replaced by removing the bars 59. When they are sharpened it is a simple matter to compensate for the reduced thickness by putting more shims beneath them. The depth of cut is controlled by the relative heights of the ribs 48 in front of the cutter heads 20 and the ribs 50 behind the cutter heads. The cutting edges 57 of the slicing members are set at the height of the ribs 50. To change the thickness of wafer cut the cross bars 17 carrying the cutter heads are replaced by other cross bars having a different relative height of the ribs 50 with respect to the ribs 48. It is thus possible to cut billets into wafers of predetermined thickness and have uniformity of thickness and length of wafer. The wafers will break into a variety of widths as they are curled back between the ribs 48 by the gullet 56 of the slicing member 55. The ribs 61 on the cross bars 18 are of the proper height to be in the same plane as the ribs 48 on the cross bars 17 as they travel past the feed outlet opening 4 from the feed box 3.

It is believed to be evident from the foregoing description that I have provided a simple rugged machine for slicing wood billets into wafers or chips of uniform thickness and length. With this machine the product can be controlled accurately and there is practically no waste in fines.

Having thus described my invention, I claim:

1. A wafer cutting machine, adapted to slice wafers from a wood billet, comprising an endless power driven conveyor made up of two endless chains trained around spaced sprocket wheels and cross bars removably secured to and connecting said chains, a billet feed box having an outlet opening to said conveyor and having means therein operable to press a billet therein through said opening against the cross bars, certain of said cross bars having cutter heads thereon provided with means to slice a wafer from the billet as the cross bar is drawn across the billet, a chain backing frame positioned on the inside of the conveyor opposite the outlet opening of the feed box, having guide bars for said chains operable to prevent movement of the chains away from the feed box outlet by pressure of the billet, said chains having lateral extensions provided with bearing members opposite the cross bars and bearing plates affixed to the feed box at the sides of the outlet opening, on which said members ride.

2. The device defined in claim 1 wherein said bearing members are rollers, and the chain has rollers riding on said guide bars, said rollers being on a common axle.

3. The device defined in claim 1 wherein the bearing members are bars and the bars are slidable on the bearing plates.

4. The device defined in claim 1 wherein the chains have cross bar supporting bars integral with the links thereof, there being three supporting bars for each cross bar and the cross bar being secured to only the middle one of the three.

5. A wafer cutting machine adapted to slice wafers from a wood billet, said machine comprising an endless power-driven conveyor having thereon cross bars, a block feeding means operable to feed and press a wood billet against the cross bars and to hold the billet against movement in the direction of travel of the conveyor, certain of said cross bars carrying cutter heads thereon, each of said cutter heads comprising a slicing member having a cutting edge and a gullet beneath the edge to receive the wood sliced from the billet and a scoring blade at each end of the slicing member, the cutter head carrying cross bars being separated by other cross bars having billet receiving surfaces thereon extending in the direction of travel of the conveyor, and positioned to engage the billet and limit its advance between engagements with the cutter head carrying cross bars.

6. The device defined in claim 5 wherein the cutter head carrying cross bars have depth gage ribs thereon in front of the scoring blades operable to engage the billet as it leaves the said surface and to maintain the billet position until the cutter head engages it, and the cutter head carrying cross bars have billet engaging surfaces behind the blades at substantially the level of the cutting edge of the slicing member operable to prevent tipping of the billet behind the slicing member.

7. In a wafer cutting machine adapted to slice wafers from a wood billet, a cross bar mounted for motion across the face of a billet to be sliced, a plurality of identical cutting heads mounted on said cross bar, each comprising a slicing member having a cutting edge and a recessed gullet beneath the edge adapted to receive wood sliced by the edge, said cutting heads being aligned with one another perpendicular to the direction of motion of said cross bar, a plurality of scoring blades mounted individually one at each side of each slicing member, said blades and said slicing members being alternated in line side by side across the length of said cross bar, and means secured to said cross bar operatively engaged with each of said slicing members and said blades adapted to maintain said slicing members and said blades in fixed positions relative to the cross bar.

8. In a wafer cutting machine adapted to slice wafers from a wood billet, a travelling cutting head comprising a slicing member having a cutting edge and a recessed gullet beneath the edge adapted to receive wood sliced by the edge, and a pair of separate scoring blades abutting the slicing member at the ends of said cutting edge and closing the ends of the gullet in said slicing member, each scoring blade having a straight projecting cutting edge extending in the direction of travel outwardly beyond the cutting edge of said slicing member perpendicularly thereto.

9. A wafer cutting machine adapted to slice wafers from a wood billet comprising:
a travelling endless cutter head support;
a billet feed chute having means to guide and feed a wood billet to the support in a direction transverse to the surface of the support;
a plurality of cutter heads on the support and spaced apart in the direction of travel of the support a distance at least as great as the distance, in said direction, across the opening leading from said chute to the support;
each cutter head comprising a slicing member having a cutting edge and a gullet beneath the edge to receive the wood sliced from the billet and having scoring blades upstanding at each end of the cutting edge;
said support having billet engaging surfaces behind the cutting edge extending rearwardly at substantially the level of the cutting edge operable to prevent tipping of the billet on the slicing member.

10. A wafer cutting machine adapted to slice wafers from a wood billet comprising:
a travelling endless cutter head support;
a billet feed chute having means to guide and feed a wood billet to the support in a direction transverse to the surface of the support;
a plurality of cutter heads on the support and spaced apart in the direction of travel of the support a distance at least as great as the distance, in said direction, across the opening leading from said chute to the support;
each cutter head comprising a slicing member having a cutting edge and a gullet beneath the edge to receive the wood sliced from the billet and having scoring blades upstanding at each end of the cutting edge;
said support having depth gage ribs in front of the scoring edges to limit billet advance in front of the cutting edge; and
said support being recessed between said ribs to the next slicing member ahead for reception of wafers.

References Cited by the Examiner
UNITED STATES PATENTS

| 519,982 | 5/94 | Baumeister | 144—162 |
| 2,717,012 | 9/55 | Schneider | 144—162 |
| 2,811,183 | 10/57 | Mottet | 144—162 |
| 2,876,811 | 3/59 | Matthews | 144—162 |
| 2,936,008 | 5/60 | Brown | 144—162 |
| 2,997,082 | 8/61 | Schubert et al. | 144—162 X |

WILLIAM W. DYER, JR., *Primary Examiner.*

WILLIAM FELDMAN, MORRIS M. FRITZ, *Examiners.*